(12) United States Patent
Carter

(10) Patent No.: US 10,052,915 B2
(45) Date of Patent: *Aug. 21, 2018

(54) WHEEL AXLE ASSEMBLY

(71) Applicant: Mark C. Carter, Murrieta, CA (US)

(72) Inventor: Mark C. Carter, Murrieta, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/658,318

(22) Filed: Jul. 24, 2017

(65) Prior Publication Data

US 2017/0320357 A1    Nov. 9, 2017

Related U.S. Application Data

(62) Division of application No. 14/746,478, filed on Jun. 22, 2015, now Pat. No. 9,834,037.

(51) Int. Cl.
| | |
|---|---|
| *B60B 35/02* | (2006.01) |
| *B60B 7/00* | (2006.01) |
| *B60B 7/06* | (2006.01) |
| *B60B 35/04* | (2006.01) |
| *B62B 1/00* | (2006.01) |
| *B62B 1/18* | (2006.01) |
| *B62B 1/26* | (2006.01) |
| *B60B 37/10* | (2006.01) |
| *B60B 3/00* | (2006.01) |
| *B60B 35/00* | (2006.01) |

(52) U.S. Cl.
CPC ............ *B60B 35/025* (2013.01); *B60B 3/001* (2013.01); *B60B 7/0013* (2013.01); *B60B 7/06* (2013.01); *B60B 35/04* (2013.01); *B60B 37/10* (2013.01); *B62B 1/008* (2013.01); *B62B 1/18* (2013.01); *B62B 1/26* (2013.01); *B60B 35/006* (2013.01); *B60B 2200/43* (2013.01)

(58) Field of Classification Search
None
See application file for complete search history.

(56) References Cited

U.S. PATENT DOCUMENTS

| | | | |
|---|---|---|---|
| 4,765,646 A | 8/1988 | Cheng | |
| 6,626,117 B1 * | 9/2003 | Chapman | ............ B60B 33/0002 105/169 |
| 6,808,186 B1 * | 10/2004 | Su | ........................... B60B 37/10 280/47.24 |
| 7,278,693 B2 | 10/2007 | Smith et al. | |

(Continued)

OTHER PUBLICATIONS

International Search Report dated Aug. 8, 2016 for PCT Application No. PCT/US2016/033308.

*Primary Examiner* — James A Shriver, II
*Assistant Examiner* — Hilary Lynn Johns
(74) *Attorney, Agent, or Firm* — Seyfarth Shaw LLP; Puya Partow-Navid

(57) ABSTRACT

A releasable wheel assembly includes a bracket having multiple bosses, each boss including a hole that receives an axle. A pair of wheels are mounted on the axle and a pair of locking caps fit over respective ends of the axle, the locking caps each including a clip for engaging the axle at a circumferential groove to prevent movement of the locking cap along the axle. The wheel assembly can be mounted to a carry bag or other storage unit by mounting the bracket to the storage unit, where the wheels and axle can be easily removed from the bracket.

21 Claims, 4 Drawing Sheets

(56) References Cited

U.S. PATENT DOCUMENTS

| | | | |
|---|---|---|---|
| 7,617,956 B1* | 11/2009 | Sabbah | A45C 5/143 190/18 A |
| 2005/0179313 A1 | 8/2005 | Liu | |
| 2006/0181141 A1 | 8/2006 | Morris | |
| 2007/0056868 A1* | 3/2007 | Godshaw | A45C 5/14 206/373 |

* cited by examiner

WHEEL AXLE ASSEMBLY

CROSS-REFERENCE TO RELATED APPLICATION

The present application is a divisional of U.S. patent application Ser. No. 14/746,478, filed on Jun. 22, 2015, and titled "WHEEL AXLE ASSEMBLY," the disclosure of which is expressly incorporated by reference herein in its entirety.

BACKGROUND

The present invention is directed to wheel axle assemblies, and more particularly to a wheel assembly for moving heavy objects over flat or uneven terrain with the capability of easily removing the wheel assembly for the purpose of changing the wheels or for storing the device.

Collapsible shelters such as those offered by International E-Z Up, Inc. have become ubiquitous at parks, beaches, athletic events, and a myriad of other locations where respite from the sun and other elements is desired. These collapsible shelters are perfect for creating a covered environment during the event, and then the shelter is quickly collapsed into a compact configuration for transportation. The ease in which these shelters are expanded and contracted have led to widespread commercial success, but the shelters can be relatively heavy, weighing up to forty pounds or more. For this reason, a carry case with handles is typically provided to make the transportation of the shelter easier. In light of the weight factor, however, it may be preferable to roll the shelter while in the carrying case rather than carrying the shelter when transporting the shelter to and from the event. Accordingly, some models include a protective carrying case or bag that is equipped with small (approximately one inch) wheels that are part of the carrying case and allow the encased shelter to roll along a smooth flat surface. An issue arises, however, when the permanently attached wheels must navigate some irregular terrain such as sand or uneven pavement. The top heavy carry case can become unstable, making it difficult to roll the shelter. Moreover, the permanent wheels cannot be exchanged for different wheels if the terrain or conditions suggest a different set.

What is needed is a solution to the transportation of shelters, carrying cases, and other bulk objects in general that includes an exchangeable wheel assembly that promotes movement over a variety of surfaces and terrains, and which can be easily removed when desired such that the unit may be stacked or be stored without the wheel assembly while further permitting the facile change of one set of wheels for another.

SUMMARY OF THE INVENTION

The present invention is a wheel assembly for a case or other bulk object that includes an axle that can be mounted to a fixed bracket. The bracket is attached to the bulk object such as a roller bag or carrying case, and the wheel assembly quickly and easily mounts to the bracket via bosses extending from the bracket. The axle of the wheel assembly is supported by the bosses to provide a rolling engagement that allows the attached wheels to rotate freely. The wheels in this configuration can be substantially larger, such as four to six inches or more, to better navigate uneven surfaces or problematic terrain such as sand or gravel. The wheels on the axle fix the assembly to the bracket through the bosses, such that as long as the wheels are in place the wheel assembly is reliably secured to the bracket on the bulk object. When the wheel assembly is no longer needed or an exchange of the wheels are desired, a first wheel is removed from the axle to allow the axle to be slid through and out the bosses, leaving only the bracket on the bulk object. In the case of a wheel exchange, the new wheels can be mounted on the axle and quickly replaced on the bracket.

To secure the wheels to the axle while permitting quick release, the wheels may be locked on the axle with a specialized locking cap placed over the ends of the axle. The locking cap incorporates a two stage clip that holds the wheel onto the axle when secured to the assembly. To facilitate engagement of the clip with the axle, the axle may be provided with an annular groove between the end of the axle and the outer surface of the wheel. The annular groove is engaged by the two stage clip, which may have a hairpin-like shape including a first stage having a semi-circular (or other polygonal or rounded shape) portion with a diameter/width greater than the diameter of the annular groove on the axle, and a second stage having a parallel, pinched, or necked configuration wherein opposite sides of the second stage are separated by a distance that is less than the diameter of the axle and are biased to bear against the surface of the annular groove. The two stage clip can easily be manually transitioned from a first position in which the clip is engaged with the axle at the narrowed (second stage) portion thereby fixing the wheel while simultaneously preventing the wheel from slipping off the axle, to a second position where the larger circular (first stage) portion of the clip is loosely about the axle, permitting the clip to easily slip off the axle and thereby allowing the wheel to be removed from the axle. Once a wheel is removed, the axle may be slipped through the bosses on the bracket and the entire wheel assembly separated from the bracket.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
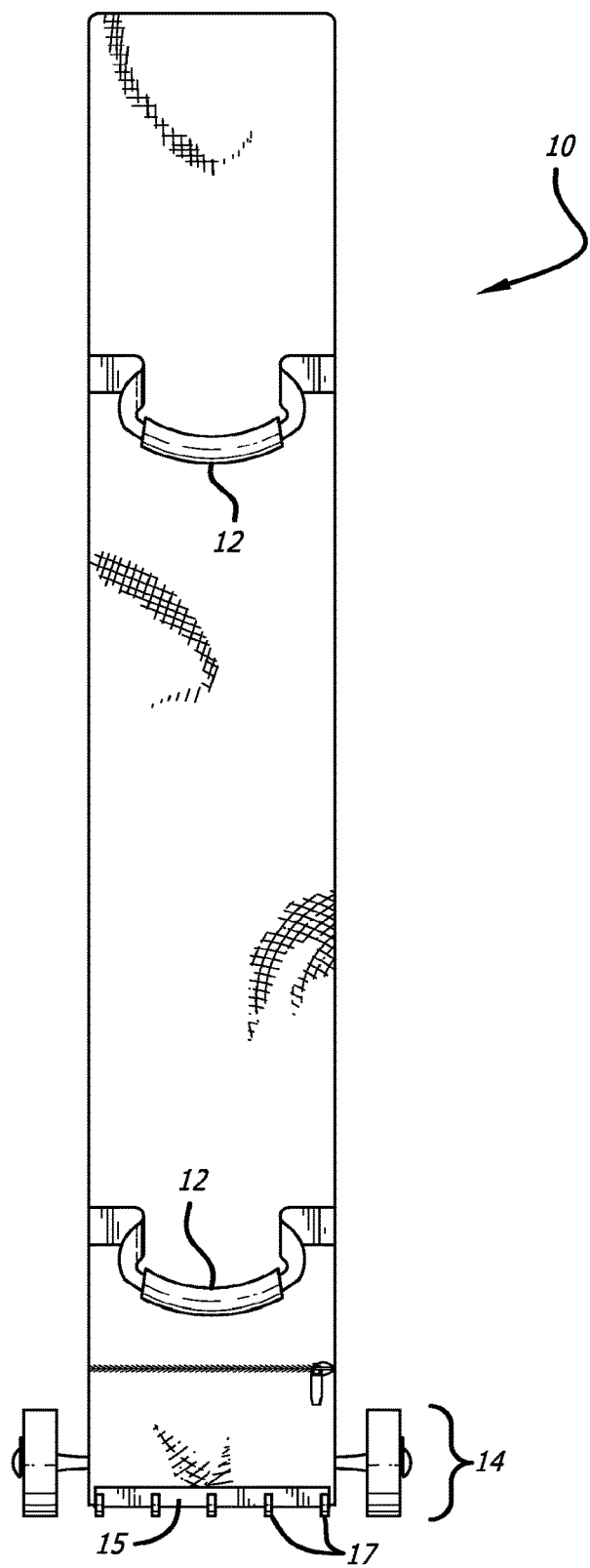
FIG. 1 is a front view of a carrying case incorporating a first embodiment of a wheel assembly of the present invention.

FIG. 1 depicts a case 10 for a collapsible shade station, which may be a flexible cloth material or a more resilient sturdy material (e.g., plastic, aluminum, or the like) as dictated by the needs of the user. The case 10 may include handles 12 along with a zippered opening along a top surface or bottom surface, although other closure means are possible. Also, while shown in generally a rectangular profile, the case 10 may take a number of different shapes and sizes without departing from the present invention. Along a bottom edge of the case 10 is a wheel assembly 14 that can be quickly and easily affixed to and released from the case 10 as needed using a quick-release system as described more fully below. It is to be understood that while a two-wheeled assembly is illustrated, the invention can be incorporated into multiple other wheel counts, particularly three and four wheeled variants. The case 10 preferably includes a stabilizer 15 on the opposite side of the wheel assembly. The stabilizer 15 may include small legs 17 or other projections that offset the inclination of the carrying case 10 due to the presence of the wheel assembly. The stabilizer 15 establishes an optimum angle of inclination of the carry case 10 when the wheel assembly is in place to make tilting the carrying case easy for rolling. That is, the stabilizer 15 can offer a 10 to 20 degree tilt of the carrying case 10 with the wheel assembly in place that keeps the carrying case upright but makes the transition from upright to tilt easier for the user.

Figure 2:
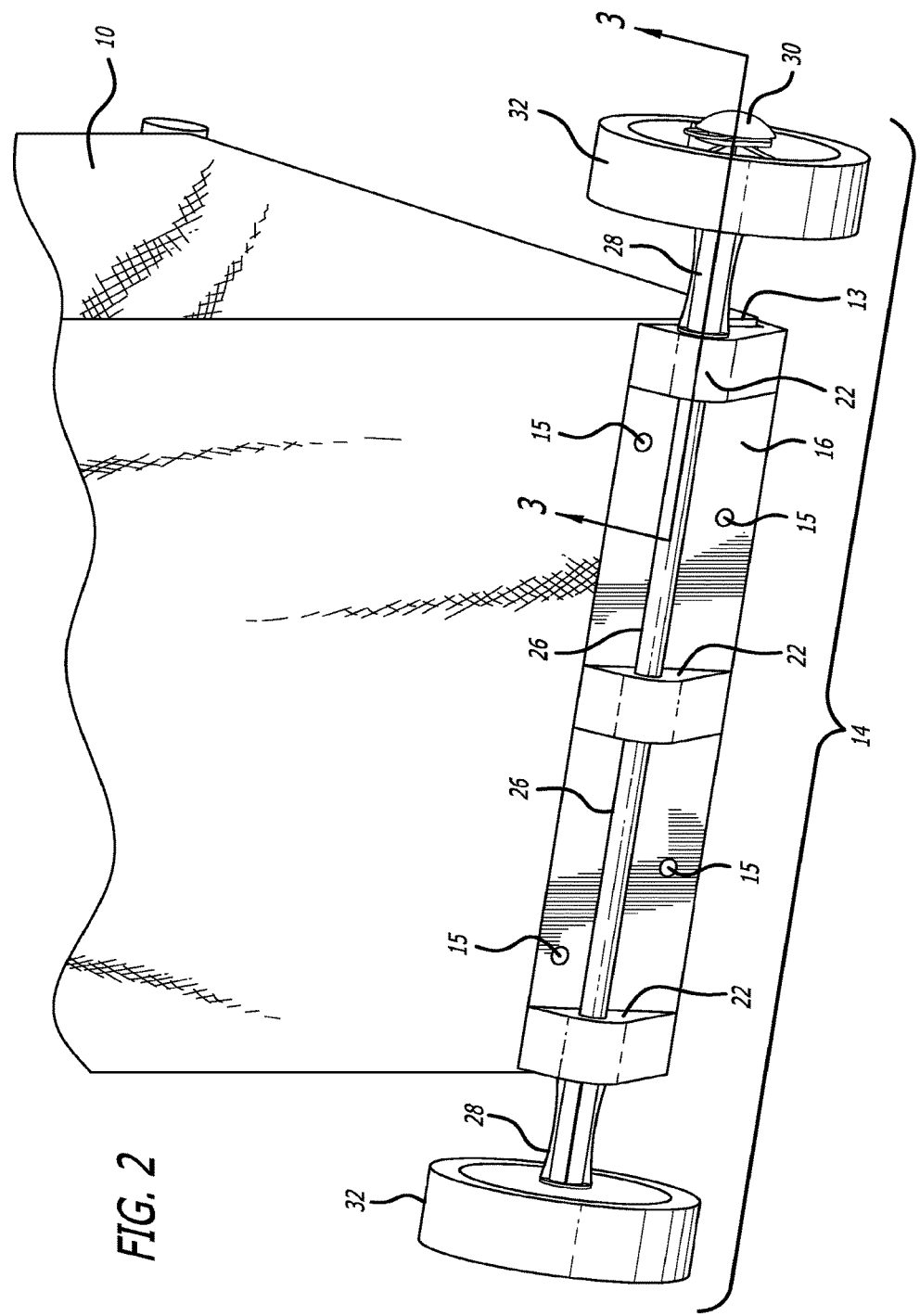
FIG. 2 is an enlarged perspective view of the wheel assembly of FIG. 1.
Figure 3:
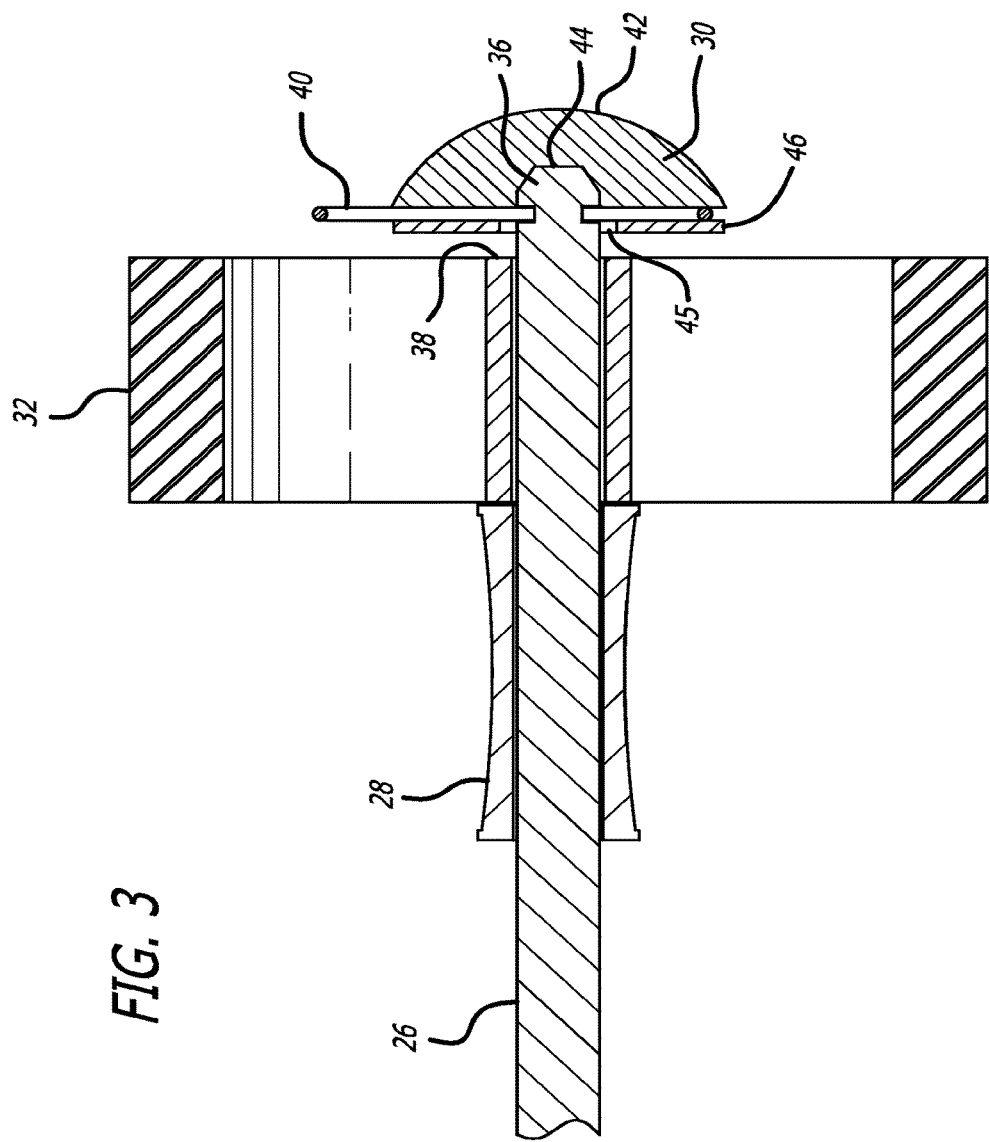
FIG. 3 is a cross sectional view of the wheel and locking cap of FIG. 1.

As seen in FIG. 2, the wheel assembly 14 includes an "L"-shaped bracket 16 mounted to a first bottom edge 13 of the roller bag or case 10 using rivets 15, snaps, sewn stitches, ties, or other mode of securely attaching the bracket 16. In the case of rivets 15, the bracket is formed with a plurality of holes that permit the rivets 15 to pass through and cooperate with matching holes on the surface of the case 10. For a less permanent coupling, the bracket 16 can snap onto the case 10 using the appropriate structures (snaps, locking tabs, etc.), although the preferred embodiment is to permanently affix the bracket to the case 10 using some rigid connection. The "L"-shaped bracket 16 includes a first horizontal surface 18 and a first vertical surface 20, where the bottom edge 13 of the case 10 mates with the bracket's horizontal and vertical surfaces 18, 20 in a complementary manner. The attachment of the bracket 16 to the case 10 is preferably through both the horizontal and vertical surfaces using fasteners 15 of a particular type to create a more secure coupling of the bracket and the case.

The bracket 16 is formed with a plurality of bosses 22 to carry the axle 26 of the wheel assembly. The bosses 22 preferably have a triangular profile with a rounded vertex, where each boss 22 is equally spaced apart along the bracket 16 and are generally congruent, although different thicknesses are possible for end and middle bosses. The bosses 22 each include a hole of a diameter selected to accommodate the axle 26 of the wheel assembly 14, each hole aligned collinearly with the holes of the other bosses 22. Thus, a single axle 26 can pass through the plurality of bosses 22 of the bracket 16 in such a manner that the axle 26 when disposed in the bosses 22 is substantially parallel to the edge 13 of the case 10 and parallel to the horizontal surface 18 of the bracket 16. It is to be understood that the number and shape of the bosses 22 are not critical to the present invention as long as the axle 26 is adequately supported on the bracket 16 and may rotate freely on the bracket without wobble or excessive play.

With the bracket 16 secured to the case 10, an axle 26 can be passed through the bosses 22 as shown in FIG. 2. With the axle 26 disposed in the bracket 16 at the collinear holes, a pair of spacers 28 can be placed over the ends of the axle on the outside of the outermost bosses to center the axle 26 on the bracket 16 and prevent transverse displacement of the axle when in use. The spacers 28 are preferably cylindrical sleeves with an inner diameter that is slightly greater than the diameter of the axle 26 to create a loose fit on the axle, and the spacers 28 have a length such that when both spacers 28 are placed on the axle 26 on the outside of the bracket 16, the axle still has enough length to support at least one pair of wheels 32 and a pair of locking end caps 30. After the spacers 28 are placed on the axle, a pair of wheels 32, preferably having a diameter that is at least four inches (4"), are then placed on the axle 26 for rotational movement thereabout. The spacers 28 center the wheels 32 with respect to the case 10, allowing the case to be pulled over both smooth and rough surfaces such as asphalt, sand, gravel, dirt, etc., with the large wheels 32 rolling easily over imperfect surfaces.

To secure the wheels 32 to the axle 26, each end of the axle includes a circumferential groove 34 approximately one half to one inch (½"-1") from the end of the axle 26. The circumferential groove 34 establishes a reduced radial dimension when compared with the adjoining sections of the axle 26. In a preferred embodiment, the tips on the end of the axle 26 adjacent the circumferential groove 34 terminate in a frusto-conical element 36 that tapers at the end of the axle. When the wheels 32 and the spacers 28 are both mounted on the axle 26 about the bracket 16, the circumferential groove 34 and the frusto-conical element 36 are exposed adjacent the wheel hub 38. The locking caps 30 are then placed over the frusto-conical element 36 and the circumferential groove 34 to lock the wheels 32 on the axle 26 in a fixed wheel assembly 14. With the wheels 32 in place and locked on the axle 26, the case 10 can thusly be rolled over flat or uneven surfaces (such as for example from a vehicle to a beach or grass park), and when the wheel assembly 14 is no longer needed, one of the locking caps 30 can be removed, the wheel 32 and spacer 28 removed, and the axle 26 slid through the bosses 22 of the bracket 16 to completely disassemble the wheel assembly 14 from the case 10. When removed, the case 10 may be stored in a more compact configuration without the large wheels 32 taking up unnecessary space. Also, different types of wheels can be exchanged and replaced with little effort by disassembling the wheel assembly and simply exchanging one set of wheels for another.

Figure 4:
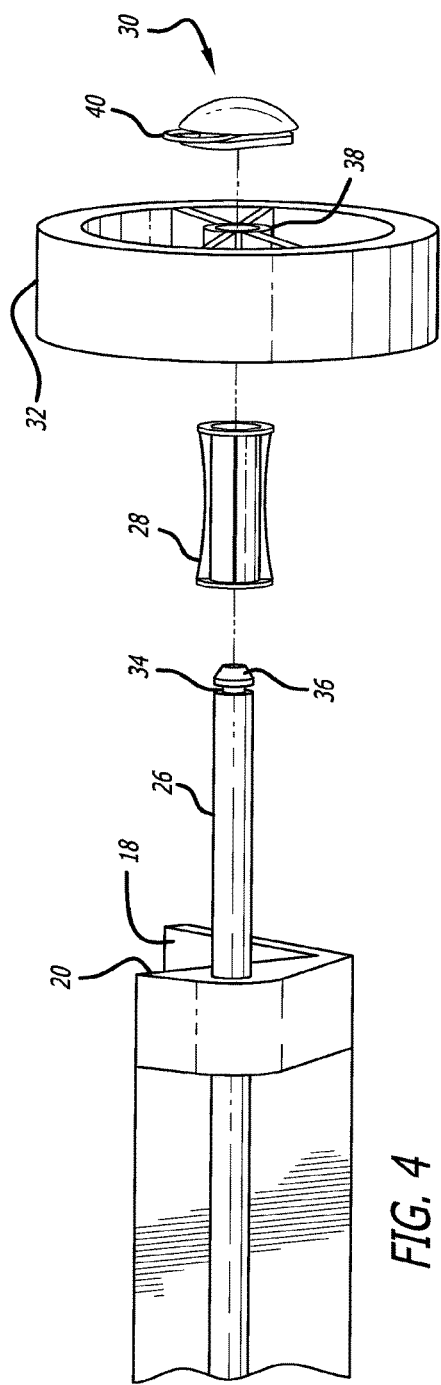
FIG. 4 is an exploded view of the wheel assembly of FIG. 1.
Figure 5:
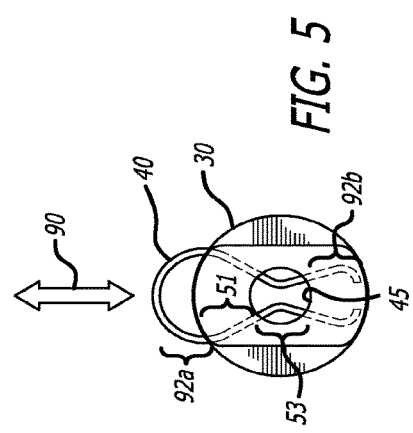
FIG. 5 is a front view, partially in shadow, of the locking cap of FIG. 1.

The locking caps 30 are designed to engage the axle 26 at the circumferential groove 34 using a two-stage clip 40 having two sections or stages, an interfering part 53 and a non-interfering part 51 (See FIG. 5). When the non-interfering (first stage) part 51 is centered within the locking cap 30, the wire or bar that forms the semi-circular portion does not engage the circumferential groove 34 on the axle 26, permitting the end cap 30 to slide over (and off) the axle freely. The end cap 30 can be positioned on the axle 26 or removed from the axle when the clip 40 is in this position. Once the spacers 28 and wheels 32 are mounted on the axle 26, the locking caps 30 are placed over the frusto-conical elements 36 of the axle such that the clip 40 is aligned over the circumferential groove 34. With the locking cap 30 in this position, the clip 40 is pushed or otherwise urged from the larger, semi-circular portion of the clip 40 over the circumferential groove 34 to the narrower, necked, pinched, or smaller diameter portion of the clip being centered within the locking cap 30 (See FIG. 5). The clip 40 in this configuration slips into the circumferential groove 34 and about the axle 26 at its reduced radius, preventing the locking cap 30 from sliding along the axle 26 and, if the fit between the clip 40 and the groove 34 is sufficiently tight, will "lock" the locking cap 30 onto the axle 26 at the circumferential groove 34 (See FIG. 4). The wheel assembly 14 is now fully operational and can be used for its intended purpose.

To disassemble the wheel assembly 14, the two stage clip 40 is pulled or otherwise transitioned from the narrow or smaller diameter portion being centered over the axle 26 to the larger diameter portion (in the direction of arrow 90 of FIG. 5), disengaging the clip 40 from the circumferential groove 34 on the axle 26. In a preferred embodiment, the clip 40 is transitioned by simply pushing a portion 92a, 92b of the clip 40 that extends out of the locking cap 30 until the proper stage of the clip 40 is engaged or disengaged with the circumferential groove 34 on the axle 26. Once the locking cap 30 is disengaged, it can be slid off the axle 26 and the spacer 28 and wheel 32 removed. The axle 26 can then be removed from the bracket 16 by sliding it out of the bosses 22 in a quick and convenient manner. The wheels 32, spacers 28, and locking caps 30 can be stored separately from the roller bag/carrying case 10, conserving space when compared with the assembled configuration.

The locking caps 30 may include a dome-shaped hub cap section 42 to cover the end of the axle, including a frusto-conical aperture 44 sized to receive the mating end of the axle so as to center the locking cap 30 on the axle 26 and establish the correct placement of the clip 40 over the circumferential groove 34 when the mating frusto-conical elements are fully engaged. The locking cap 30 further includes a smooth face plate 46 that bears against the outer hub 38 of the wheel 32 when the locking cap 30 is locked on the axle 26 to prevent the wheel 32 from drifting on the axle. The face plate 46 includes a hole 45 sized to allow the axle 26 to pass through and enter the aperture 44 on the hub cap section 42. The face plate 46 and the hub cap 42 are connected in such a manner that the clip 40 can enter the path of the axle 26 as it moves from the face plate 46 to the hub cap 42. This can be achieved, for example, by arcuate connectors (not shown) above and below the hole 45 in the face plate 46 that connect the face plate 46 to the hub cap 42, but between the arcuate connectors are gaps that the clip's narrow section 53 to intercede and engage the circumferential groove 34 when needed to lock the end cap 30 on the axle 26.

The clip 40 on the locking cap 30 may be a metal rod that is bent or otherwise formed into the two stage clip, although the clip 40 could take other forms such as a plate having a cut-out of the shape needed to engage and disengage the axle. The clip 40 is held between the dome-shaped hub cap 42 and the face plate 46 so that it can move linearly from its first position (disengaged) to its second position (engaged) but is otherwise captured between the two portions of the locking cap 30. When the clip 40 is in the second or engaged position, the larger diameter section 92a of the clip 40 protrudes beyond the face plate 46 and dome-shaped cap 30 as shown in FIG. 5. A user can push down on the exposed larger section 92a of the clip 40 in the direction of arrow 90 to force the narrow portion 53 of the clip off the circumferential groove 34 and thereby disengage the clip 40 from the axle 26. This action in turn preferably exposes the narrow or smaller diameter portion 92b of the clip on the opposite side of the locking cap 30 while the larger diameter section 51 is about the axle 26. In a like manner, the clip 40 can be engaged by pushing the smaller diameter or narrow section 92b of the clip so that the clip 40 engages the axle 26 at the circumferential groove 34, locking the cap 30 while exposing the larger diameter section 92a on the opposite side. In this manner, the locking cap 30 can be quickly and easily engaged and disengaged with the axle 26 by simply manually pushing on the exposed portion of the clip 40. It is important that the fit between the clip 40 and the circumferential groove 34 be of a sufficient character that the clip 40 will not become disengaged when the case 10 is rolled over rough or uneven terrain, so the press fit should take some effort to engage and disengage to promote the desired operation.

The invention may be embodied in other forms without departure from the benefits and characteristics described. The embodiments described therefore are to be considered in all respects as illustrative and not restrictive. Although the present invention has been described in terms of certain preferred embodiments, other embodiments and that are apparent to those of ordinary skill in the art are also within the scope of the invention.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A releasable wheel assembly comprising:
    a bracket comprising a plurality of bosses, each boss comprising a hole;
    an axle passing through the hole of each boss, the axle comprising first and second circumferential grooves adjacent a respective end of the axle;
    a first pair of wheels on the axle, the axle extending through a hub on each wheel;
    a spacer disposed between a wheel of the first pair of wheels and a boss of the plurality of bosses, the axle extending through the spacer; and
    a pair of locking caps adapted to fit over a respective end of the axle, the locking caps each comprising a clip for engaging the axle at a circumferential groove to prevent movement of the locking cap along the axle.

2. The releasable wheel assembly of claim 1, wherein the locking cap includes a hub cap and a face plate, where the clip is disposed between the hub cap and the face plate.

3. The releasable wheel assembly of claim 2, wherein the clip includes a first portion adapted to slide over the axle without engagement therewith, and a second portion adapted to engage the axle at the circumferential groove.

4. The releasable wheel assembly of claim 3, wherein the clip is hairpin shaped having a rounded first portion and a necked second portion.

5. The releasable wheel assembly of claim 4, wherein the assembly includes a pair of spacers, each disposed between the bracket and a respective one of the wheels.

6. The releasable wheel assembly of claim 2, wherein each hub is triangular shaped.

7. The releasable wheel assembly of claim 2, wherein the axle includes frusto-conical ends and the locking cap includes apertures to receive said frusto-conical ends.

8. The releasable wheel assembly of claim 2, wherein the bracket is "L"-shaped having a horizontal surface and a vertical surface adapted to engage a corner of a storage unit.

9. The releasable wheel assembly of claim 8, further comprising a plurality of rivets in the bracket for attachment to the storage unit.

10. The releasable wheel assembly of claim 8, wherein the storage unit is a flexible bag.

11. The releasable wheel assembly of claim 2, wherein the face plate bears against an outer hub on an adjacent wheel.

12. The releasable wheel assembly of claim 2, wherein the clip can be engaged with and disengaged from the axle by manually moving the clip in a radial direction with respect to the axle.

13. The releasable wheel assembly of claim 12, wherein a portion of the clip extends from a gap between the face plate and the hub cap in both the engaged and disengaged positions.

14. The releasable wheel assembly of claim 1, further comprising a second pair of wheels that can be exchanged with the first pair of wheels.

15. The releasable wheel assembly of claim 1, further comprising a second pair of wheels that are disposed on the axle adjacent the first pair of wheels.

16. A releasable wheel assembly comprising:
   a bracket comprising a plurality of bosses, each boss comprising a hole;
   an axle passing through the hole of each boss, the axle comprising first and second circumferential grooves adjacent to respective end of the axle;
   a first plurality of wheels on the axle, the axle extending through a hub on each wheel;
   a plurality of spacers, a first spacer of the plurality of spacers disposed between a first wheel of the plurality of wheels and a first boss of the plurality of bosses, a second spacer of the plurality of spacers disposed between a second wheel of the plurality of wheels and a second boss of the plurality of bosses, a third boss of the plurality of bosses disposed between the first boss and the second boss, and the axle extending through each wheel of the plurality of wheels and extending through each spacer of the plurality of spacers; and
   a plurality of locking caps, a locking cap of the plurality of locking caps configured to fit over a respective end of the axle, respective locking caps comprising a clip for engaging the axle at a circumferential groove to prevent movement of the locking cap along the axle.

17. The releasable wheel assembly of claim 16, wherein a locking cap of the plurality of locking caps comprises a hub cap and a face plate, where the clip is disposed between the hub cap and the face plate.

18. The releasable wheel assembly of claim 17, wherein the clip comprises a first portion adapted to slide over the axle without engagement therewith, and a second portion adapted to engage the axle at the circumferential groove.

19. The releasable wheel assembly of claim 18, wherein the clip is hairpin shaped having a rounded first portion and a necked second portion.

20. The releasable wheel assembly of claim 17, wherein the bracket is "L"-shaped having a horizontal surface and a vertical surface adapted to engage a corner of a storage unit.

21. The releasable wheel assembly of claim 16, further comprising a second plurality of wheels that can be exchanged with the first plurality of wheels.

* * * * *